(12) United States Patent
Wilhelmsson et al.

(10) Patent No.: US 10,998,940 B2
(45) Date of Patent: May 4, 2021

(54) SIGNAL STRENGTH SCALING OF AN UPLINK MEASUREMENT SIGNAL AND CORRESPONDING UPLINK TRANSMISSION BEAM ACCORDING TO AN ESTIMATED INTERFERENCE LEVEL

(71) Applicant: Telefonaktiebolaget LM Ericsson (publ), Stockholm (SE)

(72) Inventors: Leif Wilhelmsson, Lund (SE); Dzevdan Kapetanovic, Lund (SE); Athanasios Stavridis, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/967,176

(22) PCT Filed: Feb. 15, 2018

(86) PCT No.: PCT/EP2018/053784
§ 371 (c)(1),
(2) Date: Aug. 4, 2020

(87) PCT Pub. No.: WO2019/158200
PCT Pub. Date: Aug. 22, 2019

(65) Prior Publication Data
US 2021/0083729 A1     Mar. 18, 2021

(51) Int. Cl.
*H04B 7/0408* (2017.01)
*H04B 7/0413* (2017.01)
(Continued)

(52) U.S. Cl.
CPC ......... *H04B 7/0408* (2013.01); *H04B 7/0617* (2013.01); *H04B 7/0695* (2013.01);
(Continued)

(58) Field of Classification Search
CPC .. H04B 7/0408; H04B 17/345; H04B 7/0617; H04B 7/0695; H04B 7/088; H04W 52/146; H04W 52/243; H04W 52/325
See application file for complete search history.

(56) References Cited

U.S. PATENT DOCUMENTS

| 9,019,905 B2 * | 4/2015 | Kazmi | H04W 52/247 370/329 |
| 2017/0311187 A1 | 10/2017 | Dong et al. | |
| 2019/0349864 A1 * | 11/2019 | Zhang | H04W 52/325 |

FOREIGN PATENT DOCUMENTS

| EP | 2056505 A1 | 5/2009 |
| WO | 2017135852 A1 | 8/2017 |

OTHER PUBLICATIONS

Kapetanovic, D. et al., "Training Protocols for DL MU-MIMO in 802.11ay", Mar. 1, 2017, pp. 1-26, IEEE 802.11-17/0419r1, IEEE.
(Continued)

*Primary Examiner* — David S Huang
(74) *Attorney, Agent, or Firm* — Coats & Bennett, PLLC

(57) ABSTRACT

A method is disclosed for a wireless communication device (WCD) configured to receive, using a combiner selected from a plurality of combiners available at the WCD, downlink transmissions from a wireless communication node (WCN) via a downlink transmission beam selected from a plurality of downlink transmission beams available at the WCN. The method comprises, for each of the plurality of combiners, estimating an interference level experienced at the WCD. The method also comprises transmitting a measurement signal on each of a plurality of uplink transmission beams for selection of the downlink transmission beam by the WCN. Each of the plurality of uplink transmission beams corresponds to a respective one of the plurality of combiners available at the WCD. A signal strength of the measurement signal on an uplink transmission beam is
(Continued)

responsive to the estimated interference level for the corresponding combiner. Corresponding arrangement, WCD and computer program product are also disclosed.

21 Claims, 5 Drawing Sheets

(51) Int. Cl.
  *H04B 7/0452* (2017.01)
  *H04B 7/06* (2006.01)
  *H04B 17/345* (2015.01)
  *H04W 52/14* (2009.01)
  *H04W 52/24* (2009.01)
  *H04W 52/32* (2009.01)
  *H04B 7/08* (2006.01)

(52) U.S. Cl.
  CPC .......... *H04B 7/088* (2013.01); *H04B 17/345* (2015.01); *H04W 52/146* (2013.01); *H04W 52/243* (2013.01); *H04W 52/325* (2013.01)

(56) References Cited

OTHER PUBLICATIONS

Vokia et al., "Uplink Power Control for MIMO", 3GPP TSG RAN WG1 NR Ad-Hoc Meeting, Spokane, US, Jan. 16, 2017, pp. 1-5, R1-1701109, 3GPP.

* cited by examiner

SIGNAL STRENGTH SCALING OF AN UPLINK MEASUREMENT SIGNAL AND CORRESPONDING UPLINK TRANSMISSION BEAM ACCORDING TO AN ESTIMATED INTERFERENCE LEVEL

TECHNICAL FIELD

The present disclosure relates generally to the field of wireless communication. More particularly, it relates to the selection of downlink transmission beam for wireless communication.

BACKGROUND

In wireless communication, deployment of multiple antennas in wireless communication nodes (WCN; e.g., base stations, such as eNodeB or gNodeB, configured to operate in accordance with a Third Generation Partnership Project, 3GPP, standard or access points, AP, configured to operate in accordance with an IEEE802.11 standard) and wireless communication devices (WCD; e.g., user equipments, UEs, configured to operate in accordance with a Third Generation Partnership Project, 3GPP, standard or stations, STAs, configured to operate in accordance with an IEEE802.11 standard) typically results in a significant enhancement in terms of data rate. Such enhancement may, for example, be achieved by application of one or more of: spatial multiplexing, transmit diversity, receive diversity, and array processing gain.

Furthermore, in the framework of multiuser communication, multiple-input multiple-output (MIMO) techniques may be used to establish space division multiple access (SDMA) systems where multiple WCDs are served at the same time using radio resources from one WCN or multiple coordinated WCNs (wherein—provided there is sufficient coordination between multiple WCNs—these WCNs can operate as a single multi-antenna transmitter). The downlink (DL) transmission of a SDMA system typically includes scenarios where a WCN concurrently transmits to a number of receiving WCD (downlink multiuser MIMO).

Efficient realization of downlink multiuser MIMO utilizes a combination of transmit beam-forming and receive combining techniques, as well as the spatial separation between the WCDs, and the WCN. An objective for downlink multiuser MIMO is the formation of multiple non-interfering symbol streams between the serving WCN and the multiple served WCDs using the same time and frequency resources, wherein the Inter-Stream Interference (ISI) is eliminated or at least suppressed using beam-forming. In typical example scenarios, the transmit beam-forming can efficiently suppress the ISI when the number of Radio Frequency (RF) chains at the WCN is larger than, or equal to, the number of total RF chains summed over the WCDs. However, some suppression leading to enhanced performance can be achieved whenever the WCN deploys transmit beam-forming and the WCDs deploy receive combining.

A problem with using transmit beam-forming is to select a proper (preferably optimal) transmit beam for transmission to a WCD, and a corresponding proper (preferably optimal) combiner at the WCD for receiving the selected transmission beam. Typically, the selection is performed using some type of training.

In frequency division duplexing (FDD), the training may comprise transmitting various DL beams (e.g., a beam sweep of all the available transmission beams) from the WCN for measurement and reporting by the WCD, wherein the selection of DL transmission beam is performed at the WCN based on the reports from the WCD.

In time division duplexing (TDD), where the uplink (UL) channel uses the same frequencies as the downlink (DL) channel, channel reciprocity can be exploited to reduce the training period compared to the training in FDD. This is typically achieved by transmitting UL beams corresponding to the available combiners from the WCD for selection of DL transmission beam at the WCN. However, in the presence of interference, the beam selection resulting from such approaches may be inferior.

Therefore, there is a need for alternative (and preferably improved) approaches of selection of the downlink transmission beam. Preferably, such approaches also include alternative (and preferably improved) ways of combiner selection for reception of the downlink transmission beam. The need is particularly relevant when these approaches are used based on a general assumption of channel reciprocity.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It should be noted that, even though some illustrative scenarios are used herein as examples, problem formulations and/or embodiments may be equally applicable in relation to other scenarios where a wireless communication device (WCD) is configured to receive, using a combiner selected from a plurality of combiners available at the WCD, downlink transmissions from a wireless communication node (WCN) via a downlink transmission beam selected from a plurality of downlink transmission beams available at the WCN. For example, scenarios herein are often described using terminology associated with IEEE802.11 and a single WCN, while embodiments may be equally applicable for nodes and devices configured for operation in accordance with 3GPP standards and/or for a plurality of coordinated WCN operating as a single multi-antenna node.

It is an object of some embodiments to solve or mitigate, alleviate, or eliminate at least some of the above or other disadvantages.

According to a first aspect, this is achieved by a method for a wireless communication device (WCD) configured to receive, using a combiner selected from a plurality of combiners available at the WCD, downlink transmissions from a wireless communication node (WCN) via a downlink transmission beam selected from a plurality of downlink transmission beams available at the WCN.

The method comprises estimating an interference level experienced at the WCD for each of the plurality of combiners, and transmitting a measurement signal on each of a plurality of uplink transmission beams for selection of the downlink transmission beam by the WCN.

Each of the plurality of uplink transmission beams corresponds to a respective one of the plurality of combiners available at the WCD, and a signal strength of the measurement signal on an uplink transmission beam is responsive to the estimated interference level for the corresponding combiner.

In some embodiments, the method further comprises providing the signal strength of the measurement signal on an uplink transmission beam by scaling a default signal strength of the measurement signal by a scaling factor for the uplink transmission beam, wherein the scaling factor depends on the estimated interference level for the corresponding combiner.

In some embodiments, the plurality of uplink transmission beams, for which the transmission of the measurement signal is performed, may comprise all uplink transmission beams corresponding to a respective one of the plurality of combiners available at the WCD, or a subset thereof (typically a subset which does not experience severe interference as will be exemplified late herein).

In some embodiments, the scaling factor is equal to one when the estimated interference level is lower than a first interference threshold value.

In some embodiments, the scaling factor is equal to a value lower than one when the estimated interference level is higher than the first interference threshold value.

In some embodiments, the scaling factor is equal to zero when the estimated interference level is higher than a second interference threshold value.

In some embodiments, the measurement signal is transmitted only on uplink transmission beams for which the estimated interference level for the corresponding combiner is lower than a third interference threshold value.

In some embodiments, transmitting the measurement signal on each of the plurality of uplink transmission beams comprises performing a beam sweep over the plurality of uplink transmission beams.

In some embodiments, the method further comprises receiving a control signal from the WCN, wherein the control signal is associated with the downlink transmission beam selected by the WCN from the plurality of downlink transmission beams, and determining the combiner from the plurality of combiners responsive to the control signal.

In some embodiments, the control signal is indicative of the downlink transmission beam selected by the WCN, and wherein determining the combiner comprises selecting the combiner responsive to the downlink transmission beam indicated by the control signal.

In some embodiments, the control signal is indicative a suitable combiner for reception of the downlink transmission beam selected by the WCN, and wherein determining the combiner comprises using the suitable combiner indicated by the control signal.

In some embodiments, the method further comprises receiving, using the determined combiner, the downlink transmissions from the WCN via the downlink transmission beam indicated by the control signal.

In some embodiments, estimating the interference level experienced at the WCD comprises measuring the interference level using each of the plurality of combiners during a sensing period.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a wireless communication device (WCD) configured to receive, using a combiner selected from a plurality of combiners available at the WCD, downlink transmissions from a wireless communication node (WCN) via a downlink transmission beam selected from a plurality of downlink transmission beams available at the WCN.

The arrangement comprises controlling circuitry configured to cause estimation of an interference level experienced at the WCD for each of the plurality of combiners, and transmission of a measurement signal on each of a plurality of uplink transmission beams for selection of the downlink transmission beam by the WCN.

Each of the plurality of uplink transmission beams corresponds to a respective one of the plurality of combiners available at the WCD, and a signal strength of the measurement signal on an uplink transmission beam is responsive to the estimated interference level for the corresponding combiner.

A fourth aspect is a wireless communication device comprising the arrangement of the third aspect.

In some embodiments, any of the above aspects may additionally have features identical with or corresponding to any of the various features as explained above for any of the other aspects.

An advantage of some embodiments is that selection of the downlink transmission beam is enabled (and typically improved) for scenarios with interference. This advantage is particularly prominent when selection approaches are used, which are based on a general assumption of channel reciprocity.

Another advantage of some embodiments is that the selection of the reception combiner is enabled (and typically improved) for scenarios with interference. This advantage is particularly prominent when selection approaches are used, which are based on a general assumption of channel reciprocity.

Yet an advantage of some embodiments is that the approach is completely transparent to the WCN, which does not need any modification to function in the context of the embodiments presented herein.

Yet another advantage of some embodiments is that the training time may be reduced compared to prior art approaches since some UL beams may not need to be transmitted at all during the training period.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where a wireless communication node (WCN) is to transmit information to a wireless communication device (WCD) using one of a plurality of downlink transmission beams available at the WCN and the WCD is to receive the information using one of a plurality of combiners available at the WCD. Embodiments provide an approach to enable the selection of the downlink transmission beam and/or the selection of the combiner.

Figure 1:
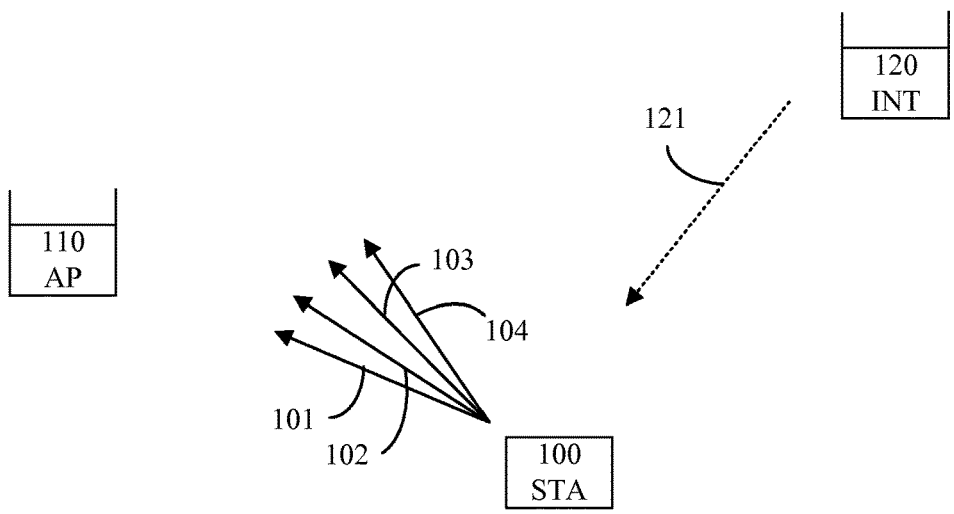
FIG. 1 is a schematic drawing illustrating an example scenario according to some embodiments.

FIG. 1 schematically illustrates an example scenario where embodiments may be applicable, and where the WCN and the WCD are exemplified by an access point (AP) 110 and a station (STA) 100, respectively.

If channel reciprocity is assumed (e.g., for a TDD system), the training process for selecting the downlink transmission beam may comprise the STA transmitting training signals on each of a plurality of uplink transmission beams 101, 102, 103, 104, wherein the plurality of uplink transmission beams corresponds to the plurality of combiners available at the STA. The AP may then use the training signals to select the downlink transmission beam and the combiner as is well known in the art. For example, the combiner corresponding to the uplink transmission beam, whose receive signal-to-interference ratio (SIR) is highest at the AP, may be selected, and a downlink transmission beam may be selected that is most suitable for that combiner. When SIR is used herein, it is meant to encompass also related metrics, e.g., signal-to-interference-and-noise ratio (SINR).

In the scenario of FIG. 1, an interferer (INT) 120 causes interference 121 experienced at the STA but not experienced at the AP (or experienced to a lesser degree at the AP). The interferer may, for example, be another access point or another STA connected to another access point. In such scenarios, the above-defined strategy may result in an inferior selection of the downlink transmission beam and the corresponding combiner. This is due to that the interference 121 causes the SIR experienced at the AP to be higher than the SIR experienced at the STA. Thereby, the channel reciprocity assumption is not valid in terms of SIR. Therefore, a pair of downlink transmission beam and combiner that is deemed optimal by observations at the AP may, in fact, be sub-optimal at the STA. For example, the interference 121 may severely affect the receive combiners of the STA corresponding to UL transmission beams 101 and 102. Then, even if those beams are received with good signal quality at the AP, the selection of a corresponding DL transmission beam and STA combiner may be largely inferior and result in very bad downlink performance. Embodiments presented herein aim at mitigating this problem.

Figure 2:
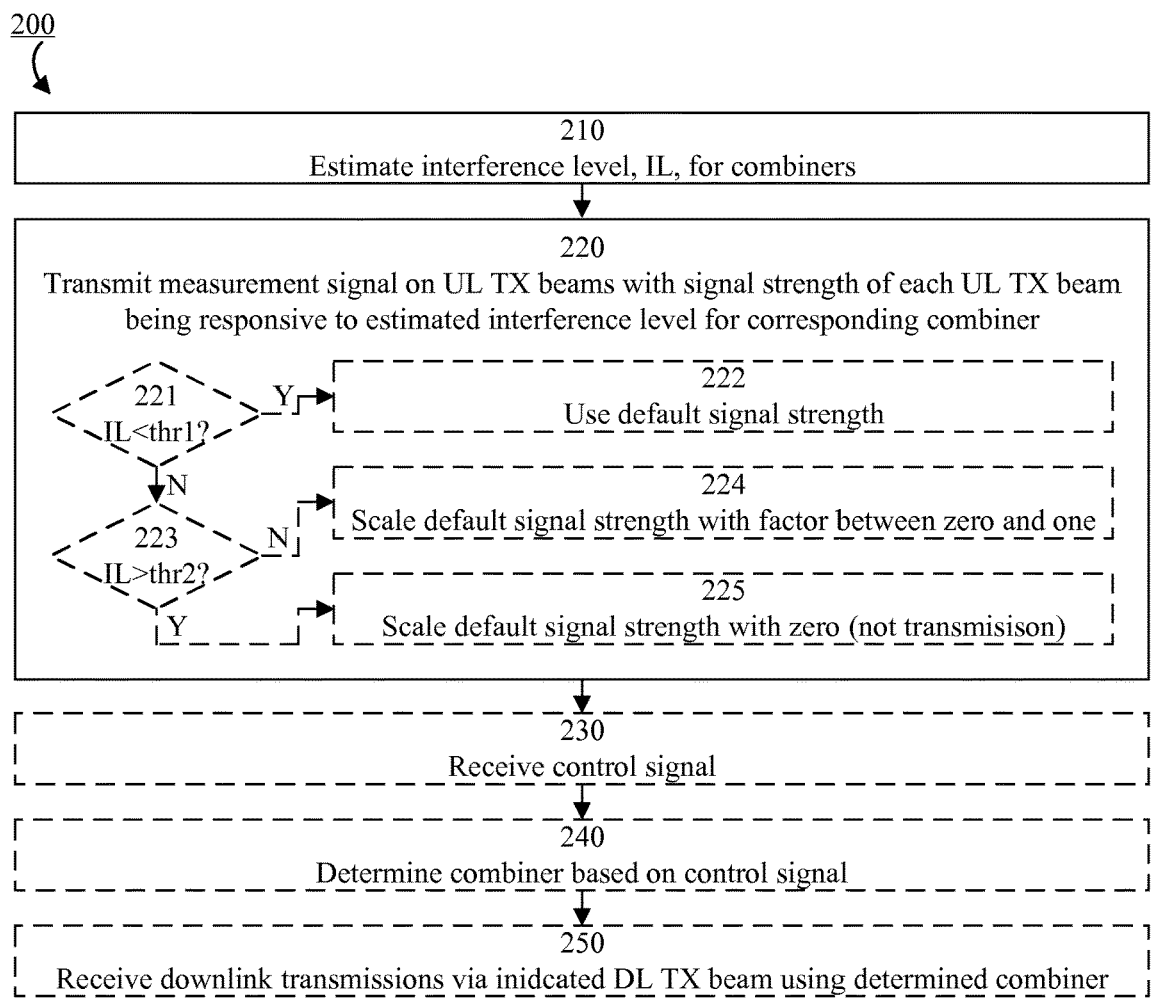
FIG. 2 is a flowchart illustrating example method steps according to some embodiments.

FIG. 2 illustrates an example method 200 according to some embodiments. The method is for a WCD (e.g., the STA 100 of FIG. 1) configured to receive, using a combiner selected from a plurality of combiners available at the WCD, downlink transmissions from a WCN (e.g., the AP 110 of FIG. 1) via a downlink transmission beam selected from a plurality of downlink transmission beams available at the WCN. The method may be particularly suitable in scenarios where a general assumption regarding the channel reciprocity is applied to the uplink and downlink channels so that training signals transmitted on the uplink transmission beam are used for the downlink transmission beam selection (e.g., for TDD systems).

The method 200 starts in step 210, where the WCD estimates the interference level (IL) experienced at the WCD. The estimation may be performed in response to a triggering signal from the WCN or it may be initiated autonomously by the WCD. The estimation is performed in relation to each combiner in the plurality of combiners and may be achieved using any suitable (known or future) interference estimation approach.

For example, estimating the interference level experienced at the WCD may comprise measuring the interference level using each of the plurality of combiners during a sensing period. In some embodiments, such a sensing period is emptied of communication to and/or from the WCN, so that interference measurement is facilitated. The interference estimation may, for example, be based on received signal strength (e.g., a received signal strength indicator, RSSI).

The estimation in the sensing period may be performed in response to a triggering signal from the WCN (which triggering signal may also define the sensing period) or it may be initiated autonomously by the WCD (in which case the sensing periods may be predefined and known to the WCD).

In some embodiments, the interference estimation may be performed for all (or some) combiners simultaneously, thereby allowing the sensing period to be reduced (compared to if sensing was performed in sequence for the combiners). In other embodiments, the interference estimation may be performed for one combiner at a time, which lowers the requirements on reception circuitry and signal processing for estimation. The latter alternative may also provide more accurate interference estimation.

Alternatively or additionally to performing the interference estimation in a sensing period, estimating the interference level experienced at the WCD may comprise measuring the interference level by repeatedly scanning a communication channel using each of the plurality of combiners. In some embodiments, such scanning may need to be performed in the presence of communication to and/or from the WCN.

This approach for interference estimation is particularly practical when the WCD is required to start transmitting the measurement signal in step 220 with short latency between a request for training signals received from the WCN, in which case step 210 may be initiated autonomously by the WCD.

Thus, a request for training signals received by the WCD from the WCN may comprise a triggering signal for step 210 or a triggering signal for step 220.

In step 220, the WCD transmits a measurement signal (a training signal) on each uplink transmission (UL Tx) beam corresponding to a respective combiner in the plurality of combiners available at the WCD.

The measurement signal transmission on the uplink transmission beams is for the selection of the downlink transmission beam by the WCN. The measurement signal transmission on the uplink transmission beams may additionally be for the selection of the combiner by the WCN according to some embodiments. The selection of the downlink transmission beam (and of the combiner) by the WCN is based on the measurement signal transmitted in step 220 and is performed using any suitable (known or future) selection approach. For example, the combiner corresponding to the uplink transmission beam, whose received signal strength or SIR is highest at the WCN, may be selected, and a downlink transmission beam may be selected that is most suitable for that combiner.

Transmitting the measurement signal on each of the plurality of uplink transmission beams is typically implemented by performing a beam sweep (in time and/or frequency) over the plurality of uplink transmission beams.

The signal strength of the measurement signal on an uplink transmission beam is responsive to the interference level for the corresponding combiner as estimated in step 210. This adjustment of the signal strength of the transmitted measurement signal aims at mitigating the problem with different SIR at WCD and WCN. Typically, for a combiner having a relatively high estimated interference level, a relatively low signal strength may be used for the transmitted measurement signal on the corresponding uplink transmission beam.

In some embodiments, the signal strength of the measurement signal on an uplink transmission beam may be provided by scaling a default signal strength of the measurement signal with a scaling factor for the uplink transmission beam, wherein the scaling factor depends on the estimated interference level for the corresponding combiner. Typically, the scaling factor may take on values in the interval from zero to one.

To further exemplify, the signal strength may be determined by comparing the estimated interference level to one or more threshold values.

For example, when the estimated interference level is lower than a first interference threshold value (thr1), corresponding to the Y-path out of optional sub-step 221, the default signal strength may be applied as illustrated by optional sub-step 222. This alternative corresponds to using a scaling factor that is equal to one.

When the estimated interference level is not lower than the first interference threshold value (thr1), corresponding to the N-path out of optional sub-step 221, the method may continue to the optional sub-step 223 in some embodiments.

When the estimated interference level is not lower than the first interference threshold value (thr1) and is not higher than a second interference threshold value (thr2), corresponding to the N-path out of optional sub-step 223, the default signal strength may be lowered as illustrated by optional sub-step 224. This alternative corresponds to using a scaling factor that is between zero and one.

When the estimated interference level is higher than a second interference threshold value (thr2), corresponding to the Y-path out of optional sub-step 223, the default signal strength may be lowered to zero as illustrated by optional sub-step 225. This alternative corresponds to using a scaling factor that is equal to zero.

In some embodiments, the N-path out of optional sub-step 221 may proceed directly to optional sub-step 225 (optional sub-steps 223 and 224 being omitted). These embodiments correspond to using only scaling factors equal to zero or one.

In some embodiments, the N-path out of optional sub-step 221 may proceed directly to optional sub-step 224 (optional sub-steps 223 and 225 being omitted). These embodiments correspond to using only scaling factors larger than zero.

Other variations may also be easily imagined. For example, the scaling factor of 224 may have a fixed value (such as 0.5) or a value that depends on the interference level. Alternatively or additionally, more than two thresholds and a finite number of fixed scaling factor values may be applied (e.g., four thresholds and the scaling factors 0, 0.25, 0.5, 0.75 and 1).

In the alternative illustrated by optional sub-step 225, the transmission of the measurement signal on the corresponding uplink transmission beam may be omitted altogether, thus providing a possibility to shorten the training period when the uplink transmission beams are swept in time. Thus, in some embodiments, the measurement signal is transmitted only on uplink transmission beams for which the estimated interference level for the corresponding combiner is lower than a third interference threshold value. The third threshold value may be equal to the second or first threshold value in various embodiments.

After the transmission of the measurement signal on the uplink transmission beams in step 220, the method may continue to step 230, where the WCD receives a control signal from the WCN, and thereafter to step 240 where the WCD determines the combiner from the plurality of combiners responsive to the control signal.

The control signal is associated with the downlink transmission beam selected by the WCN from the plurality of downlink transmission beams.

Typically, the control signal may be indicative (e.g., by means of an index value) of which combiner is to be used for reception (which combiner is associated with the selected downlink transmission beam). In such embodiments, the determination of the combiner by the WCD simply comprises using the combiner indicated by the control signal. Hence, the selection of combiner is performed by the WCN in such embodiments.

Alternatively or additionally, the control signal may be directly indicative of the selected downlink transmission beam. In such embodiments, the determination of the combiner by the WCD may comprise performing a selection of the combiner responsive to the indication of the selected downlink transmission beam.

The control signal may, typically, be received before the transmission of downlink data (information) that is to take place via the selected downlink transmission beam. For example, the control signal may be received via a dedicated feed-back channel or in the beginning of a downlink packet carrying the downlink data (e.g., as a preamble or in a dedicated control field of the packet).

When the WCD has determined the combiner in step 240, it may use it to receive the downlink transmissions from the WCN via the downlink transmission beam indicated by the control signal as illustrated by optional step 250.

Figure 3:
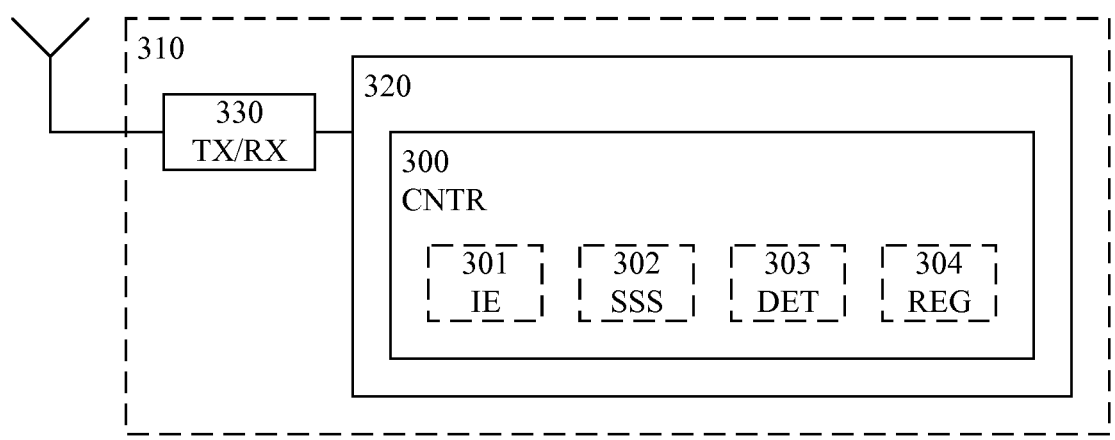
FIG. 3 is a schematic block diagram illustrating an example arrangement for a wireless communication device according to some embodiments.

FIG. 3 schematically illustrates an example arrangement 320 according to some embodiments. The arrangement 320 is for a WCD (compare with the STA 100 of FIG. 1) configured to receive, using a combiner selected from a plurality of combiners available at the WCD, downlink transmissions from a WCN via a downlink transmission beam selected from a plurality of downlink transmission beams available at the WCN. For example, the arrangement may be comprised in a WCD 310 and/or may be configured to cause execution of one or more method steps described in connection with FIG. 2.

The arrangement 320 comprises controlling circuitry (CNTR) 300 configured to cause estimation of an interference level experienced at the WCD for each of the plurality of combiners. To this end the controlling circuitry may comprise or be otherwise associated with interference estimating circuitry (e.g., an interference estimator, IE, 301) configured to estimate the interference level experienced at the WCD for each of the plurality of combiners. Examples in this respect of the operations of the controlling circuitry and/or the interference estimating circuitry may be deduced from the description of step 210 of FIG. 2.

The controlling circuitry 300 is also configured to cause transmission of a measurement signal on each of a plurality of uplink transmission beams for selection of the downlink transmission beam by the WCN, wherein each of the plurality of uplink transmission beams corresponds to a respective one of the plurality of combiners available at the WCD, and wherein a signal strength of the measurement signal on an uplink transmission beam is responsive to the estimated interference level for the corresponding combiner.

To this end the controlling circuitry may comprise or be otherwise associated with transmission circuitry (e.g., a transmitter, illustrated in FIG. 3 in the form of a transceiver, Tx/RX, 330) configured to transmit the measurement signal. Examples in this respect of the operations of the controlling circuitry and/or the transmission circuitry may be deduced from the description of step 220 of FIG. 2.

In some embodiments, the controlling circuitry may be configured to cause provision of the signal strength of the measurement signal on an uplink transmission beam by causing scaling of default signal strength of the measurement signal by a scaling factor for the uplink transmission beam, wherein the scaling factor depends on the estimated interference level for the corresponding combiner.

To this end the controlling circuitry may comprise or be otherwise associated with signal strength scaling circuitry (e.g., a signal strength scaler, SSS, 302) configured to scale the default signal strength of the measurement signal by the scaling factor. Examples in this respect of the operations of the controlling circuitry and/or the signal strength scaling circuitry may be deduced from the description of step 220 of FIG. 2.

The controlling circuitry 300 may also be configured to cause reception of a control signal from the WCN, wherein the control signal is associated with the downlink transmission beam selected by the WCN from the plurality of downlink transmission beams.

To this end the controlling circuitry may comprise or be otherwise associated with reception circuitry (e.g., a receiver, illustrated in FIG. 3 in the form of the transceiver, Tx/RX, 330) configured to receive the control signal. Examples in this respect of the operations of the controlling circuitry and/or the reception circuitry may be deduced from the description of step 230 of FIG. 2.

The controlling circuitry 300 may also be configured to cause determination of the combiner from the plurality of combiners responsive to the control signal.

To this end the controlling circuitry may comprise or be otherwise associated with determination circuitry (e.g., a determiner, DET, 303) configured to determine the combiner responsive to the control signal. Examples in this respect of the operations of the controlling circuitry and/or the determination circuitry may be deduced from the description of step 240.

The controlling circuitry 300 may also be configured to cause reception, using the selected combiner, of the downlink transmissions from the WCN via the downlink transmission beam indicated by the control signal.

To this end the controlling circuitry may comprise or be otherwise associated with reception circuitry (e.g., a receiver, illustrated in FIG. 3 in the form of the transceiver, Tx/RX, 330) configured to receive the control signal. Examples in this respect of the operations of the controlling circuitry and/or the reception circuitry may be deduced from the description of step 250 of FIG. 2.

The controlling circuitry may also comprise or be otherwise associated with storing circuitry (e.g., a register, REG, 304) for storing of parameters relating to the plurality of combiners (e.g., a codebook for reception combining). In some embodiments the storing circuitry may also be for storing one or more of parameters relating to the plurality of uplink transmission beams (e.g., a codebook), the plurality of downlink transmission beams (e.g., a codebook), interference estimates relating to the plurality of combiners, etc.

Thus, according to various embodiments, approaches to interference aware uplink training for multiuser MIMO downlink transmission is provided as will be further exemplified in the following.

As explained above, there is at least one problem with the selection of beams and combiners (i.e. which beam-formers and combiners to be used out of the available ones in a codebook) when TDD with UL training is considered. This problem is that the conventional selection principles may not work properly (potentially resulting in inferior selection) when one or more WCDs experiences interference; e.g., from a non-serving WCN or other WCD.

Embodiments present a solution to this problem by undertaking a preliminary interference sensing at the WCD before the UL training period. In particular, the WCD may determine (before the UL training period) which UL beam-formers, and consequently which combiners in its codebook, that are affected by the interference (and possibly to what extent). When these beam-formers are identified, they may either be neglected completely (not transmitted at all) during the UL training period or they may be penalized by the use of a reduced transmission power when they are applied in the UL training period. Typically, the first option may be used when interference is severe and the second option may be used when the interference is less severe; to mimic the effect of interference at the WCN, i.e. artificially reducing the SIR received at the WCN.

An advantage of some embodiments is that UL training may still be used also in the presence of interference without suffering from some of the problems inherent in the prior art solutions. This is achieved by avoiding, in the UL training, the use of combining matrices (beam-formers) at the WCD which suffer from interference; particularly interference which cannot be measured by the WCN.

An additional advantage is that the solutions according to embodiments presented herein are transparent at the WCN.

Yet another advantage is that, according to some embodiments, the training period may be reduced since the UL beam-formers that suffer from interference are not used during the training period in these embodiments.

As mentioned above, the transmit beam-forming can efficiently suppress the Inter-Stream Interference (ISI) when the number of Radio Frequency (RF) chains at the AP is larger than, or equal to, the number of total RF chains summed over the STAs, and some suppression leading to enhanced performance can be achieved whenever the AP deploy transmit beam-forming and the STAs deploy receive combining.

In some examples to follow herein, a general hybrid architecture may be considered, where an AP with $N^{AP}$ antennas and $1 \leq N_{RF}^{AP} < N^{AP}$ RF chains serves K STAs. Each STA has $N^{STA}$ antennas and $1 \leq N_{RF}^{STA} < N^{STA}$ RF chains. In such an architecture, the AP can use an analog and digital (baseband) beam-former (precoder). Similarly, every STA can deploy an analog and digital combiner.

The analog processing may be implemented using RF phase-shifters which may be controlled in a digital way. The analog beam-formers at the AP and the analog combiners at the STAs typically belong to finite codebooks since the possible RF phases shifts are finite and there is no amplitude tuning.

In digital processing, due to its flexibility, the digital beam-formers and combiners may be selected based either on a codebook or on an approach without codebook.

In the first case (analog processing implemented using RF phase-shifters controlled in a digital way), the digital beam-formers and combiners are selected from predefined codebooks aiming to optimize a certain objective function. In this case, codebook based communication is achieved where the finite deployed beam-formers and combiners belong to bigger codebooks. Note that each element of these bigger codebooks represents both the analog and digital processing.

In the first case, the digital pre-coders may be designed based on the resulting channel state information (CSI) when the effect of analog beam-forming and combining is considered. An advantage of this approach is that the resulting virtualized channel has a smaller size compared to the first case. Thereby, the duration of the channel training is reduced.

It should be noted that the codebooks can change over time, both in the value of elements and in size. In the first case, change may occur when the codebook is adjusted in order to follow the instantaneous channel conditions. In the second case, change may occur when the number of STAs is changed.

Some embodiments are particularly relevant in relation to a codebook based communication where the deployed codebook may change to follow changes in the actual wireless channel. This covers the scenario where the deployed beam-formers and combiners are elements of predefined codebooks. It also covers the analog processing part of a scenario where the analog processing is based on codebook and the digital processing is not.

The process of training depends on the system characteristics and the duplexing mode. In frequency division duplexing (FDD), training is conducted in each link direction because different carrier frequencies are used for the different link directions. In time division duplexing (TDD), the channel reciprocity resulting from that both link directions deploy the same carrier frequency can be exploited for the selection of beam-formers and combiners in both link directions. Thus, the beam-former selection for transmission from a particular transmission point (node or device) can be directly obtained from the corresponding combiner selection for reception at the same particular transmission point (node or device).

As mentioned above, embodiments are particularly aimed at the scenario (in a codebook-based environment) of selecting the transmission beam and the corresponding combiner for DL communication, wherein UL training is used due to the reciprocity principle.

The UL training may generally be conducted as follows: During the training period and sequentially for each STA, each STA deploys its beam-forming matrices in a number of slots which is equal to the size of the combining codebook of the AP (corresponds to the transmission of measurement signals using UL transmission beams) so that the AP can perform measurements for all combinations of STA beam-forming matrix and AP combiner and determine the best pair of STA beam-former and AP combiner. Due to the reciprocity principle, the AP can then select the corresponding pair of AP beam-former and STA combiner and assume that the selection is proper for the channel conditions.

However, when the STA experiences interference (that is not present, or that is less prominent, at the AP) such an approach is inferior as has been elaborated on above (e.g., in connection to FIG. 1). The interference could, for example, be caused by another AP or from a STA which is served from another AP, i.e. a transmitter that belongs to an Overlapping Basic Service Set (OBSS; e.g., a cell). Thus, the serving AP may experience weak or negligible interference at its spatial position. However, although the received SIR at the serving AP is good, the received SIR at the served STA is degraded. Embodiments aim at eliminating or mitigating this phenomenon.

For the purpose of illustration, a scenario with an AP and K STAs is considered. Both the AP and STAs are equipped with multiple antennas. Furthermore, TDD and codebook based communication is assumed and UL training is used for DL transmission relying on the channel reciprocity. The transmit codebook at the AP is denoted as $U_{Tx}^{AP} = \{U_{Tx,1}^{AP}, U_{Tx,2}^{AP}, \ldots, U_{Tx,|U_{Tx}^{AP}|}^{AP}\}$, where, $U_{Tx,i}^{AP}$, $i=1, \ldots, |U_{Tx}^{AP}|$ are the transmit beam-forming matrices. The receive combining codebook of the AP is denoted as $U_{Rx}^{AP} = \{U_{Rx,1}^{AP}, U_{Rx,2}^{AP}, \ldots, U_{Rx,|U_{Rx}^{AP}|}^{AP}\}$, where, $U_{Rx,i}^{AP}$, $i=1, \ldots, |U_{Rx}^{AP}|$ are the receive combining matrices. Similarly, the $i^{th}$ STA has a transmit beam-forming and receive combining codebook denoted as $U_{Tx}^{STA_i} = \{U_{Tx,1}^{STA_i}, U_{Tx,2}^{STA_i}, \ldots, U_{Tx,|U_{Tx}^{STA_i}|}^{STA_i}\}$, and, $U_{Rx}^{STA_i} = \{U_{Rx,1}^{STA_i}, U_{Rx,2}^{STA_i}, \ldots, U_{Rx,|U_{Rx}^{STA_i}|}^{STA_i}\}$, respectively. The elements of the transmit beam-forming codebooks and receive combining codebooks of the AP and STAs can represent analog, digital, or hybrid processing (beam-formers/combiners), and embodiments may be equally applicable in any possible combinations, between the AP and the multiple STAs, of codebook representations.

Focusing on an example scenario with UL training for DL transmission, the serving AP aims to find the best beam-former for itself from its codebook $U_{Tx}^{AP}$ and the indices of the best beam-formers during the training period for the K STAs from their beam-forming codebooks $U_{Tx}^{STA_i}$. Due to channel reciprocity, once the $i^{th}$ STA is informed about the index of the best beam-former from its codebook $U_{Tx}^{STA_i}$, it can directly select the best combiner from its receive combining codebook $U_{Rx}^{STA_i}$.

As mentioned above in connection to FIG. 1, there might be beam-formers at the STAs that—although they give a good value of SIR at the AP during the training period—correspond to combiners at the STAs that achieve low SIR. This phenomenon occurs when a selected combiner at a STA faces high interference while the corresponding interference at the AP is negligible or weak.

This problem is addressed by embodiments presented herein, wherein the STA estimates interference levels for the different combiners and takes this knowledge into account when sending the UL measurement signals for training.

In some embodiments, a sensing period is introduced before the training period. During the sensing period, the STAs identify the combiners in their combining codebook that suffer from (external) interference and/or low SIR. They may also measure the levels of interference and/or SIR which are experienced by these combiners.

If the SIR for a combiner is low (not sufficient for efficient communication), the corresponding beam-former from $U_{Tx}^{STA_i}$ may be excluded from the UL training transmission. In this way, the $i^{th}$ STA constructs a beam-forming codebook $L_{Tx}^{STA_i}$ which is a subset of its original codebook $U_{Tx}^{STA_i}$ ($L_{Tx}^{STA_i} \subseteq U_{Tx}^{STA_i}$), with, $|L_{Tx}^{STA_i}| \leq |U_{Tx}^{STA_i}|$.

Alternatively or additionally, the $i^{th}$ STA may create a vector, $w_{Tx}^{STA_i} = [w_1^{STA_i}, \ldots, w_{|L_{Tx}^{STA_i}|}^{STA_i}]$, wherein each element represents a transmit power level which is to be used during the deployment of the corresponding beam during the training period. The objective of $w_{Tx}^{STA_i}$ is to reflect the effect of interference that corresponds to the each beam-former of $L_{Tx}^{STA_i}$ at the AP by reducing the transmission power of some of the UL beams. The level of reduction depends on the level of the experienced interference, i.e. the higher the interference, the lower the value of $w_j^{STA_i}$.

The sensing period may be very short in relation to the UL training period according to some embodiments.

The sensing is typically performed by the STA without any involvement from the AP, except that the AP ensures that there is no other transmission going on in order to provide a time for measurement.

Alternatively or additionally to using a sensing period, a STA may obtain knowledge about the interference without the need for a dedicated sensing period. For example, the STA may (e.g., at predetermined intervals) scan the channel for its different combiners. Then, the STA has knowledge of the interference for the different combiners directly when the UL training is to start.

It is also possible to both scan the channel and combine the result with information obtained during a sensing period in order to improve the interference estimation accuracy.

When the STAs have constructed their codebooks $L_{Tx}^{STA_i}$ and/or their corresponding vectors $w_{Tx}^{STA_i}$ the UL training period may begin. The UL training period is typically divided into K phases, where K is the number of served STAs and the $i^{th}$ phase takes $|L_{Tx}^{STA_i}||U_{Rx}^{AP}|$ time slots. During these time slots all possible combinations of beam-formers in $L_{Tx}^{STA_i}$ and combiners in $U_{Rx}^{AP}$ are deployed. Thus, the AP is able to select the pair of transmit beam-former at the STA and receive combiner at the AP which gives the best SIR.

The index of the best beam-former in $L_{Tx}^{STA_i}$ may be conveyed to the $i^{th}$ STA using some feed-back link (e.g., a subsequent DL packet) and the STA may correspondingly select its best combiner from $U_{Rx}^{STA_i}$. When all STAs have selected their best receive combiner, the DL transmission can begin.

In addition to improving the performance of the training by also taking interference into account, the training time may be reduced. Specifically, when an UL signal is sent for each of the combiners, sequentially, the number of UL signals needed to be transmitted may be reduced when the STA can exclude one or more UL signals after determining that the corresponding combiners will not be sufficiently good.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device (e.g., a STA).

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

Figure 4:
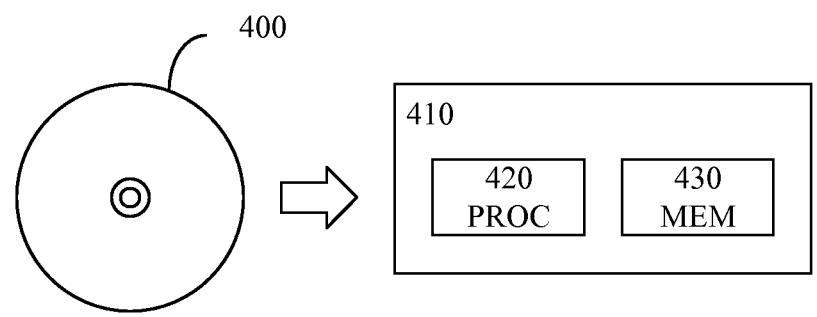
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC) 420, which may, for example, be comprised in a wireless communication device 410. When loaded into the data processing unit, the computer program may be stored in a memory (MEM) 430 associated with or comprised in the data-processing unit. According to some embodiments, the computer program may, when loaded into and run by the data processing unit, cause execution of method steps according to, for example, the method illustrated in FIG. 2 or otherwise described herein.

Figure 5:
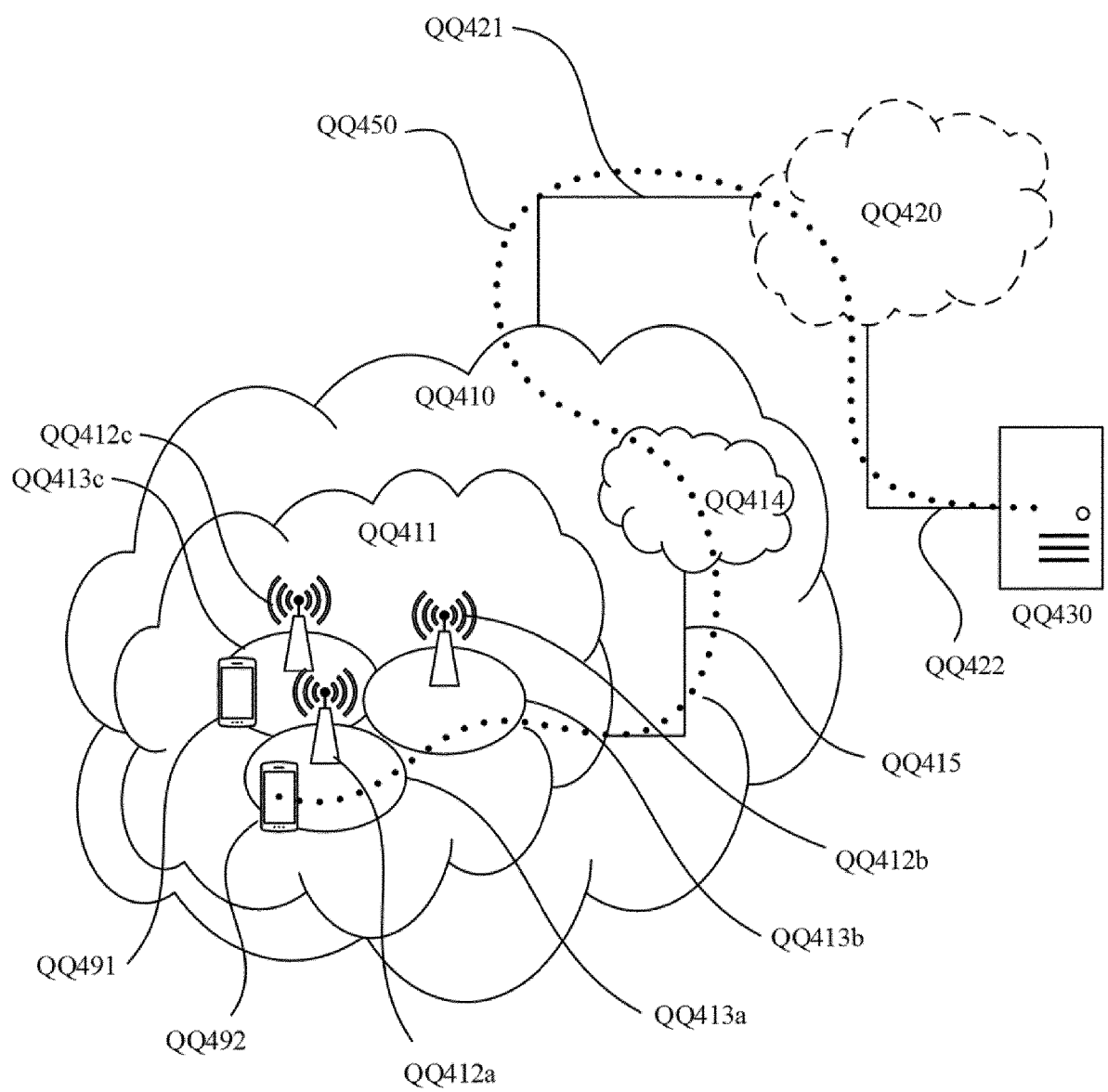
FIG. 5 illustrates a telecommunication network connected via an intermediate network to a host computer in accordance with some embodiments.

With reference to FIG. 5, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 5 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 6. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 6) served by base station QQ520. Communication interface QQ526 may be configured to facilitate connection QQ560 to host computer QQ510. Connection QQ560 may be direct or it may pass through a core network (not shown in FIG. 6) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 6:
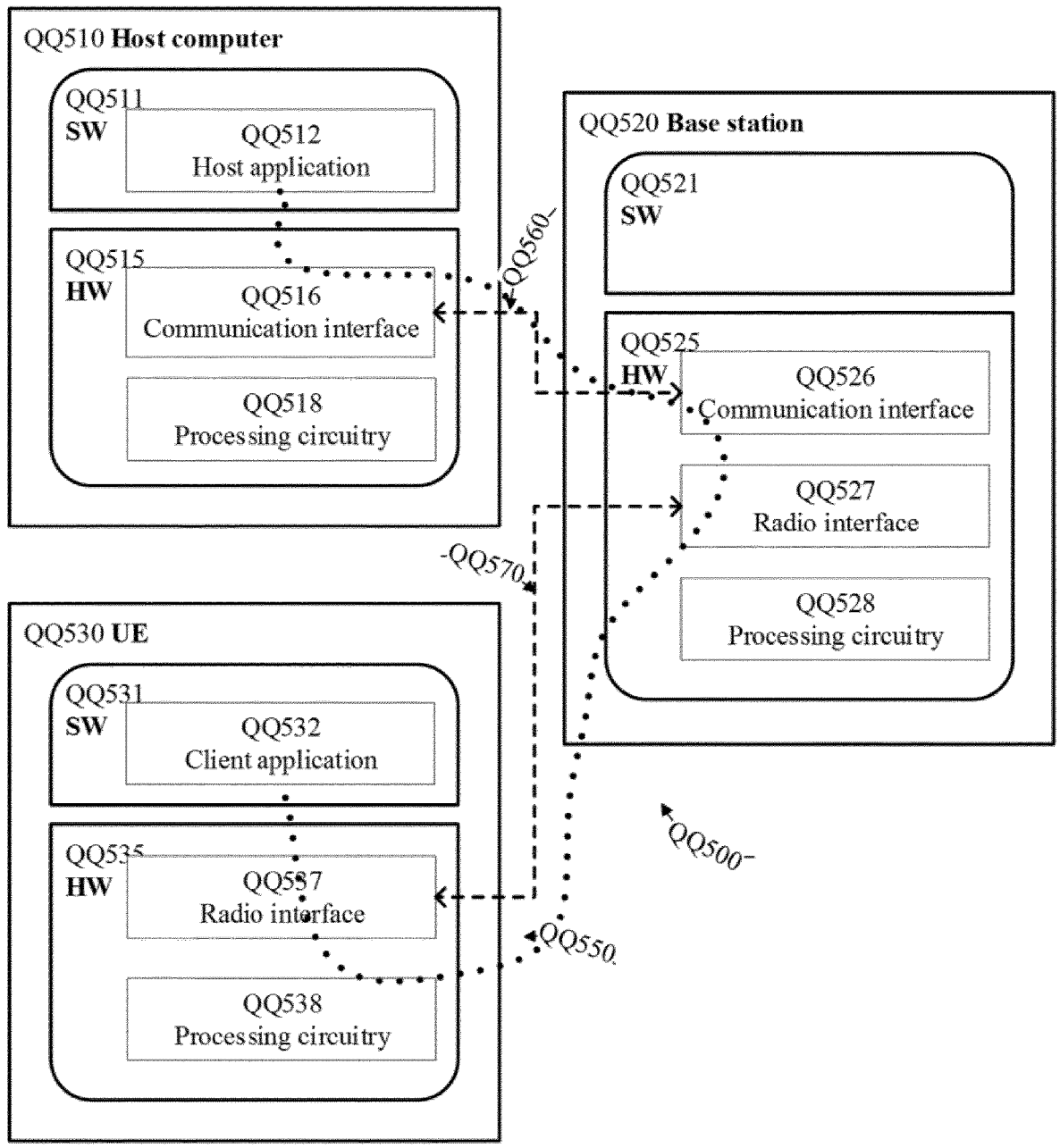
FIG. 6 illustrates a host computer communicating via a base station with a user equipment over a partially wireless connection in accordance with some embodiments.

It is noted that host computer QQ510, base station QQ520 and UE QQ530 illustrated in FIG. 6 may be similar or identical to host computer QQ430, one of base stations QQ412a, QQ412b, QQ412c and one of UEs QQ491, QQ492 of FIG. 5, respectively. This is to say, the inner workings of these entities may be as shown in FIG. 6 and independently, the surrounding network topology may be that of FIG. 5.

In FIG. 6, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the downlink transmission beam selection and thereby provide benefits such as improved throughput and/or capacity.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 7:
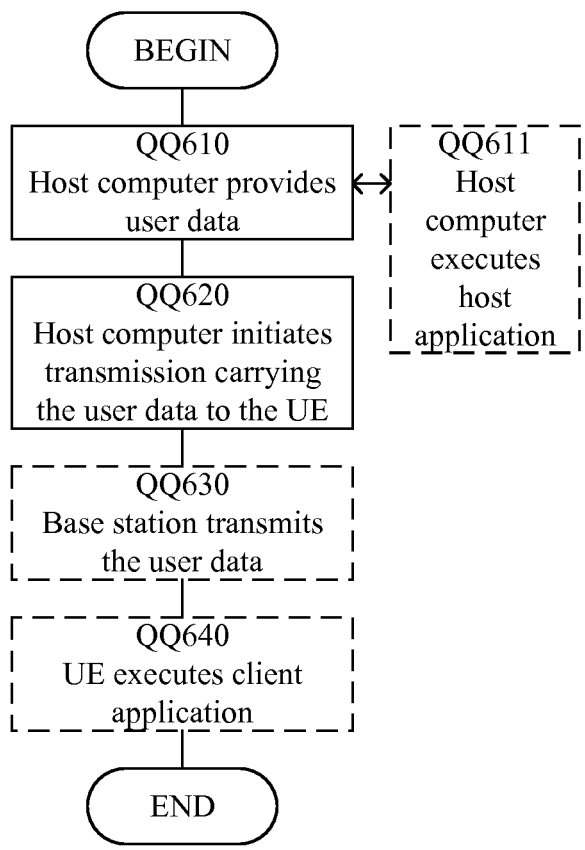
FIG. 7 is a flowchart illustrating example method steps implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 8:
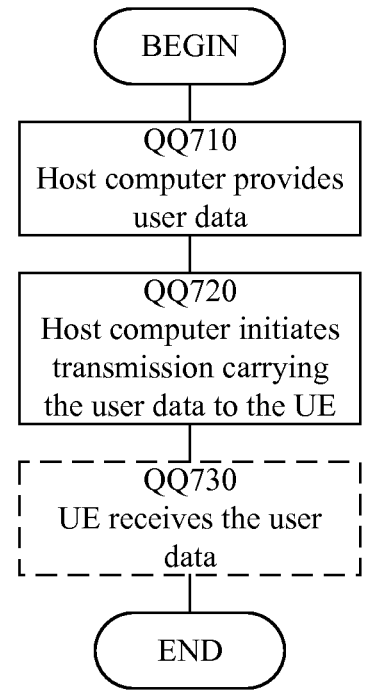
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g., a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless communication device, WCD, for downlink transmission beam selection, wherein the WCD is configured to receive, using a combiner selected from a plurality of combiners available at the WCD, downlink transmissions from a wireless communication node, WCN, via a downlink transmission beam selected from a plurality of downlink transmission beams available at the WCN, the method comprising:
for each of the plurality of combiners, estimating an interference level experienced at the WCD; and
transmitting a measurement signal on each of a plurality of uplink transmission beams for selection of the downlink transmission beam by the WCN, wherein each of the plurality of uplink transmission beams corresponds to a respective one of the plurality of combiners available at the WCD, and wherein a signal strength of the measurement signal on an uplink transmission beam is responsive to the estimated interference level for the corresponding combiner.

A2. The method of any of the previous embodiments in Group A, further comprising:
providing user data; and
forwarding the user data to a host computer via the transmission to the base station.

Group B Embodiments

B1. A method performed by a wireless communication node, WCN, for downlink transmission beam selection, wherein a wireless communication device, WCD, is configured to receive, using a combiner selected from a plurality of combiners available at the WCD, downlink transmissions from the wireless communication node, WCN, via a downlink transmission beam selected from a plurality of downlink transmission beams available at the WCN, the method comprising:
performing measurements on a measurement signal transmitted by the WCD on each of a plurality of uplink transmission beams, wherein each of the plurality of uplink transmission beams corresponds to a respective one of the plurality of combiners available at the WCD, and wherein a signal strength of the measurement signal on an uplink transmission beam is responsive to an estimated interference level experienced at the WCD for the corresponding combiner; and selecting the downlink transmission beam based on the performed measurements.

B2. The method of any of the previous embodiments in Group B, further comprising:
obtaining user data; and
forwarding the user data to a host computer or a wireless device.

Group C Embodiments

C1. A wireless device for downlink transmission beam selection, the wireless device comprising:
processing circuitry configured to perform any of the steps of any of the Group A embodiments; and
power supply circuitry configured to supply power to the wireless device.

C2. A base station for downlink transmission beam selection, the base station comprising:
processing circuitry configured to perform any of the steps of any of the Group B embodiments;
power supply circuitry configured to supply power to the base station.

C3. A user equipment (UE) for downlink transmission beam selection, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps described for the Group A embodiments.

D9. The communication system of embodiment D8, wherein the cellular network further includes a base station configured to communicate with the UE.

D10. The communication system of any of embodiments D8 through D9, wherein:
the processing circuitry of the host computer is configured to execute a host application, thereby providing the user data; and
the UE's processing circuitry is configured to execute a client application associated with the host application.

D11. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D12. The method of embodiment D11, further comprising at the UE, receiving the user data from the base station.

The invention claimed is:

1. A method for a wireless communication device (WCD) configured to receive, using a combiner selected from a plurality of combiners available at the WCD, downlink transmissions from a wireless communication node (WCN) via a downlink transmission beam selected from a plurality of downlink transmission beams available at the WCN, the method comprising:
for each of the plurality of combiners, estimating an interference level experienced at the WCD, including interference caused by a transmitter that belongs to an Overlapping Basic Service Set (OBSS);
providing a signal strength of a measurement signal on each of a plurality of uplink transmission beams, wherein each of the plurality of uplink transmission beams corresponds to a respective one of the plurality of combiners available at the WCD, and wherein the signal strength of the measurement signal is responsive to the estimated interference level for the corresponding combiner, wherein the provided signal strength comprises:
a default signal strength when the estimated interference level is lower than a first interference threshold value;
a non-zero signal strength lower than the default signal strength when the estimated interference level is not lower than the first interference threshold value and not higher than a second interference threshold value;
a zero signal strength when the estimated interference level is higher than the second interference threshold value; and
transmitting the measurement signal on each of the plurality of uplink transmission beams for selection of the downlink transmission beam by the WCN.

2. The method of claim 1:
wherein providing the signal strength of the measurement signal on the uplink transmission beam comprises scaling the default signal strength of the measurement signal by a scaling factor for the uplink transmission beam;
wherein the scaling factor depends on the estimated interference level for the corresponding combiner.

3. The method of claim 2, wherein the scaling factor is equal to one when the estimated interference level is lower than the first interference threshold value.

4. The method of claim 2, wherein the scaling factor is equal to a value lower than one when the estimated interference level is higher than the first interference threshold value.

5. The method of claim 2, wherein the scaling factor is equal to zero when the estimated interference level is higher than the second interference threshold value.

6. The method of claim 1, wherein the measurement signal is transmitted only on uplink transmission beams for which the estimated interference level for the corresponding combiner is lower than a third interference threshold value.

7. The method of claim 1, wherein transmitting the measurement signal on each of the plurality of uplink transmission beams comprises performing a beam sweep over the plurality of uplink transmission beams.

8. The method of claim 1, further comprising:
receiving a control signal from the WCN, wherein the control signal is associated with the downlink transmission beam selected by the WCN from the plurality of downlink transmission beams; and
determining the selected combiner from the plurality of combiners responsive to the control signal.

9. The method of claim 8:
wherein the control signal is indicative of the downlink transmission beam selected by the WCN;
wherein determining the selected combiner comprises selecting the combiner responsive to the downlink transmission beam indicated by the control signal.

10. The method of claim 8:
wherein the control signal is indicative a suitable combiner for reception of the downlink transmission beam selected by the WCN;
wherein determining the selected combiner comprises using the suitable combiner indicated by the control signal.

11. The method of claim 8, further comprising receiving, using the determined combiner, the downlink transmissions from the WCN via the downlink transmission beam indicated by the control signal.

12. The method of claim 1, wherein estimating the interference level experienced at the WCD comprises measuring the interference level using each of the plurality of combiners during a sensing period.

13. A non-transitory computer readable recording medium storing a computer program product for controlling a wireless communication device (WCD) configured to receive, using a combiner selected from a plurality of combiners available at the WCD, downlink transmissions from a wireless communication node (WCN) via a downlink transmission beam selected from a plurality of downlink transmission beams available at the WCN, the computer program product comprising program instructions which, when run on processing circuitry of the WCD, causes the WCD to:
for each of the plurality of combiners, estimate an interference level experienced at the WCD, including interference caused by a transmitter that belongs to an Overlapping Basic Service Set (OBSS);
provide a signal strength of a measurement signal on each of a plurality of uplink transmission beams, wherein each of the plurality of uplink transmission beams corresponds to a respective one of the plurality of combiners available at the WCD, and wherein the signal strength of the measurement signal is responsive to the estimated interference level for the corresponding combiner, wherein the provided signal strength comprises:
a default signal strength when the estimated interference level is lower than a first interference threshold value;
a non-zero signal strength lower than the default signal strength when the estimated interference level is not lower than the first interference threshold value and not higher than a second interference threshold value;
a zero signal strength when the estimated interference level is higher than the second interference threshold value; and
transmit the measurement signal on each of the plurality of uplink transmission beams for selection of the downlink transmission beam by the WCN.

14. An arrangement for a wireless communication device (WCD) configured to receive, using a combiner selected from a plurality of combiners available at the WCD, downlink transmissions from a wireless communication node (WCN) via a downlink transmission beam selected from a plurality of downlink transmission beams available at the WCN, the arrangement comprising:
processing circuitry;
memory containing instructions executable by the processing circuitry whereby the arrangement is operative to:
for each of the plurality of combiners, estimate an interference level experienced at the WCD, including interference caused by a transmitter that belongs to an Overlapping Basic Service Set (OBSS);
provide a signal strength of a measurement signal on each of a plurality of uplink transmission beams, wherein each of the plurality of uplink transmission beams corresponds to a respective one of the plurality of combiners available at the WCD, and wherein the signal strength of the measurement signal is responsive to the estimated interference level for the corresponding combiner, wherein the provided signal strength comprises:
- a default signal strength when the estimated interference level is lower than a first interference threshold value;
- a non-zero signal strength lower than the default signal strength when the estimated interference level is not lower than the first interference threshold value and not higher than a second interference threshold value;
- a zero signal strength when the estimated interference level is higher than the second interference threshold value; and transmit the measurement signal on each of the plurality of uplink transmission beams for selection of the downlink transmission beam by the WCN.

15. The arrangement of claim 14, wherein the instructions are such that the arrangement is operative to provide the signal strength of the measurement signal on the uplink transmission beam by scaling of the default signal strength of the measurement signal by a scaling factor for the uplink transmission beam, wherein the scaling factor depends on the estimated interference level for the corresponding combiner.

16. The arrangement of claim 14, wherein the instructions are such that the arrangement is operative to transmit the measurement signal only on uplink transmission beams for which the estimated interference level for the corresponding combiner is lower than a third interference threshold value.

17. The arrangement of claim 14, wherein the instructions are such that the arrangement is operative to transmit the measurement signal on each of the plurality of uplink transmission beams by performing a beam sweep over the plurality of uplink transmission beams.

18. The arrangement of claim 14, wherein the instructions are such that the arrangement is operative to:
- receive a control signal from the WCN, wherein the control signal is associated with the downlink transmission beam selected by the WCN from the plurality of downlink transmission beams; and
- determine the selected combiner from the plurality of combiners responsive to the control signal.

19. The arrangement of claim 18, wherein the instructions are such that the arrangement is operative to receive, using the selected combiner, the downlink transmissions from the WCN via the downlink transmission beam indicated by the control signal.

20. The arrangement of claim 14, wherein the instructions are such that the arrangement is operative to estimate the interference level experienced at the WCD by measuring the interference level using each of the plurality of combiners during a sensing period.

21. A wireless communication device (WCD) configured to receive, using a combiner selected from a plurality of combiners available at the WCD, downlink transmissions from a wireless communication node (WCN) via a downlink transmission beam selected from a plurality of downlink transmission beams available at the WCN; the WCD comprising:
- the plurality of combiners;
- an arrangement comprising:
    - processing circuitry;
    - memory containing instructions executable by the processing circuitry whereby the arrangement is operative to:
        - for each of the plurality of combiners, estimate an interference level experienced at the WCD, including interference caused by a transmitter that belongs to an Overlapping Basic Service Set (OBSS);
        - provide a signal strength of a measurement signal on each of a plurality of uplink transmission beams, wherein each of the plurality of uplink transmission beams corresponds to a respective one of the plurality of combiners available at the WCD, and wherein the signal strength of the measurement signal is responsive to the estimated interference level for the corresponding combiner, wherein the provided signal strength comprises:
            - a default signal strength when the estimated interference level is lower than a first interference threshold value;
            - a non-zero signal strength lower than the default signal strength when the estimated interference level is not lower than the first interference threshold value and not higher than a second interference threshold value;
            - a zero signal strength when the estimated interference level is higher than the second interference threshold value; and
        - transmit the measurement signal on each of the plurality of uplink transmission beams for selection of the downlink transmission beam by the WCN.

* * * * *